United States Patent [19]

Liu et al.

[11] Patent Number: 4,964,101

[45] Date of Patent: Oct. 16, 1990

[54] METHOD FOR DETERMINING FLUID MOBILITY CHARACTERISTICS OF EARTH FORMATIONS

[75] Inventors: Hsui-lin Liu, Ridgefield, Conn.; Philip S. Cheung, Le Vesinet, France

[73] Assignee: Schlumberger Technology Corp., New York, N.Y.

[21] Appl. No.: 327,852

[22] Filed: Mar. 23, 1989

[51] Int. Cl.[5] .............................................. G01V 1/40
[52] U.S. Cl. .......................................... 367/31; 73/152
[58] Field of Search ...................... 367/31, 35; 73/151, 73/152; 364/422

[56] References Cited

U.S. PATENT DOCUMENTS

| | | | |
|---|---|---|---|
| 3,175,639 | 3/1965 | Liben | 367/35 |
| 4,575,828 | 3/1986 | Williams | 367/31 |
| 4,594,691 | 6/1986 | Kimball et al. | 367/32 |
| 4,633,449 | 12/1986 | Ingram et al. | 367/75 |
| 4,692,908 | 9/1987 | Ekstrom et al. | 367/27 |
| 4,797,859 | 1/1989 | Hornby | 367/31 |

OTHER PUBLICATIONS

J. H. Rosenbaum, "Synthetic Microseismograms: Logging in Porous Formations," Geophysics, vol. 39, No. 1, Feb. 1974.

J. J. Staal, J. D. Robinson, "Permeability Profiles from Acoustic Logging," SPE Paper 6821, 52nd Annual Fall Technical Conference, Oct. 9–12, 1977.

D. L. Johnson, J. Koplik, R. Dashed, "Theory of Dynamic Permeability and Tortuosity in Fluid-Saturated Porous Media," J. Fluid Mech., 176, 379–402, 1987.

*Primary Examiner*—Ian J. Lobo
*Attorney, Agent, or Firm*—Peter Y. Lee

[57] ABSTRACT

A method for determining the mobility of fluids within earth formations surrounding a borehole. The preferred embodiment of the invention utilizes measured tube wave parameters such as acoustic slowness and attenuation as indicators of formation fluid mobility, and further modifies the results with a mudcake compensated parameter. The mudcake compensated parameter preferably includes a non-zero, finite membrane impedance contribution, and a mudcake elastic deformation contribution. By inputting values for certain mudcake parameters such as mudcake compressional acoustic velocity, shear velocity, density and impedance, the invention generates an improved quantitative estimate for tube wave derived mobility or permeability.

8 Claims, 8 Drawing Sheets

STEP 1

Choose initial values
$\kappa/\eta$, $Z_m$, $\beta_i$

STEP 2

Measured Parameters $\alpha_i$ →

Compute predicted Tube Wave Characteristic
$S_f(\alpha_i, \beta_i, Z_m)$

STEP 4

Perturb values
$\kappa/\eta$, $Z_m$, $\beta_i$
for better fit

STEP 3

Measured Tube Wave Characteristics $S_m$ →

Compare
$S_f(\alpha_i, \beta_i, Z_m) - S_m < \varepsilon$

NO →

YES ↓

STEP 5

Output
$\kappa/\eta$, $Z_m$, $\beta_i$

*Fig. 1A*

(PRIOR ART MODEL)

METHOD FOR DETERMINING FLUID MOBILITY CHARACTERISTICS OF EARTH FORMATIONS

FIELD OF THE INVENTION

This invention relates to methods for determining acoustic and fluid flow characteristics of subsurface earth formations traversed by a borehole, particularly the permeability or mobility of such formations as determined by continuous acoustic measurements.

BACKGROUND

An important goal in the exploration and production of hydrocarbons is to determine how much oil or gas, as the case may be, can be made to flow out of a reservoir rock formation via a producing borehole, and at what rates. These crucial parameters depend fundamentally on the permeability of the formation, the existence of fractures, and the viscosity of the fluid. It would be extremely useful to be able to predict what is the permeability of a particular earth formation traversed by a borehole, without going to the extraordinary trouble and expense of some known techniques such as that of artificially injecting fluid into that formation. Such an artificial injection procedure would require that the entire borehole, other than the selected zone of interest, be sealed off from the testing fluid, and this is time consuming and obviously troublesome. Furthermore, such injection tests can be made only for selected formations at a time, and cannot produce a continuous measurement of permeability for all zones of interest traversed by the borehole.

For the above reasons there have been strong incentives within the industry to provide reliable methods for determining formation permeability using an acoustic wireline log or some other continuous measurement which can be made during the drilling process itself, or very shortly thereafter. These various techniques are well known in the industry and will not be discussed herein, with the exception of the acoustic techniques.

The idea of using an acoustic tube wave propagating within the borehole to measure formation permeability was proposed many years ago and was considered to be conceptually promising but practically problematic. The tube wave, also commonly referred to as a Stoneley wave, is a guided surface wave which travels in the direction of the borehole axis. J. E. White has explained in his book, *Underground Sound*, Elsevier (1983), that a low frequency tube wave in a permeable borehole can be viewed as a pulsating pressure which displaces fluid alternately into and out of the borehole wall. He has set forth, in Chapter 5 of his book, some of the basic mathematical expressions which form one representation of the relationship between formation permeability and the acoustic tube wave velocity.

Actual logging techniques have been proposed which attempt to correlate measured tube wave amplitudes to the permeability of a formation traversed by the tube wave. In "Synthetic Microseismograms: Logging in Porous Formations", *Geophysics*, Vol. 39, No. 1, (Feb. 1974), J. H. Rosenbaum has computed the waveforms generated by a logging tool using Biot's theory to model the fluid saturated formation. He was able to relate the amplitude of the tube wave to permeability. Rosenbaum noted in this paper that the behavior of the mudcake (typically on the borehole wall surface) is described by the surface mudcake impedance factor $Z_m$, which is assumed to be equal to infinity in the case of a "sealed interface", and equal to zero in the case of an "open interface".

Others at Shell have reported some correlations between the acoustic energy of the tube wave, as measured by a commercially available Schlumberger acoustic tool, with measured formation permeability. This is reported in J. J. Staal and J. D. Robinson, "Permeability Profiles from Acoustic Logging", *SPE Paper* 6821, 52nd Annual Fall Technical Conference, Oct. 9-12, 1977, as a qualitative permeability correlation made between rock cores extracted from the borehole on one hand, and acoustic logs on the other. Although this kind of empirical correlation can be made for any one well by imposing certain "best fit" conditions, the correlation is not generally valid for other wells or other reservoirs, and therefore lacks predictive power.

U.S. Pat. No. 4,575,828 to Williams describes a method which attempts to determine both the permeability due to the rock matrix and the permeability due to fractures in the rock, using the ratio of tube wave amplitudes and travel times, respectively, measured at two spaced apart receivers in the borehole. Although this method also obtains results which may correlate with field data in a single well, it is believed that the method cannot consistently predict permeability in multiple wells. In fact, it is believed that none of the methods to date have been successful in quantitatively predicting permeability in boreholes.

Thus, despite the strong interest in linking acoustic waves and permeability, as shown by the above and other studies in this field, the reported eperimental results and field measurements have not heretofor yielded a clear quantitative connection which can reliably predict permeability in oil wells.

Accordingly, it is an object of the present invention to provide an improved method for quantitatively determining formation permeability using measured acoustic tube wave characteristics.

It is also an object of the invention to determine formation permeability with or without the making of comparisons to extracted cores.

It is additionally an object of the invention to impose alternative and more realistic boundary conditions for a mudcake layer in the borehole in the determination of formation permeability.

It is also an object of the invention to modify the conventional methods for determining permeability with a finite mudcake impedance contribution and a mudcake layer contribution due to elastic deformation of a mudcake layer having a finite thickness.

SUMMARY OF THE DISCLOSURE

In the present invention, a different set of assumptions are made with respect to the underlying physical interactions between an acoustic tube wave, the mudcake layer and the surrounding porous formation. In a preferred embodiment of the invention, the tube wave characteristics of slowness or amplitude are measured. Then, a mudcake compensated representation is used relating the tube wave characteristic to the physical parameters of the borehole fluid, mudcake, and formation. Two conditions are imposed: the mudcake properties are used to define a finite membrane impedance $Z_m$ contribution to the characteristic; and they are also used to define a second contribution which is dependent on the elastic deformation of the mudcake in response to the tube wave. The impedance value that is imposed using a preferred mudcake-compensated model is in the range $Z_m = (1/\omega)10^{10}-10^{11}$ dynes-sec/cm$^3$, and preferably within the range of approximately $Z_m = 2-3(1/\omega) \times 10^{10}$ dynes-sec/cm$^3$, where $\omega$ is the angular frequency of the tube wave.

BRIEF DESCRIPTION OF THE DRAWINGS

FIG. 1A shows a block diagram in accordance with a preferred embodiment of the present invention.

DETAILED DESCRIPTION OF PREFERRED EMBODIMENTS

Figure 1B:
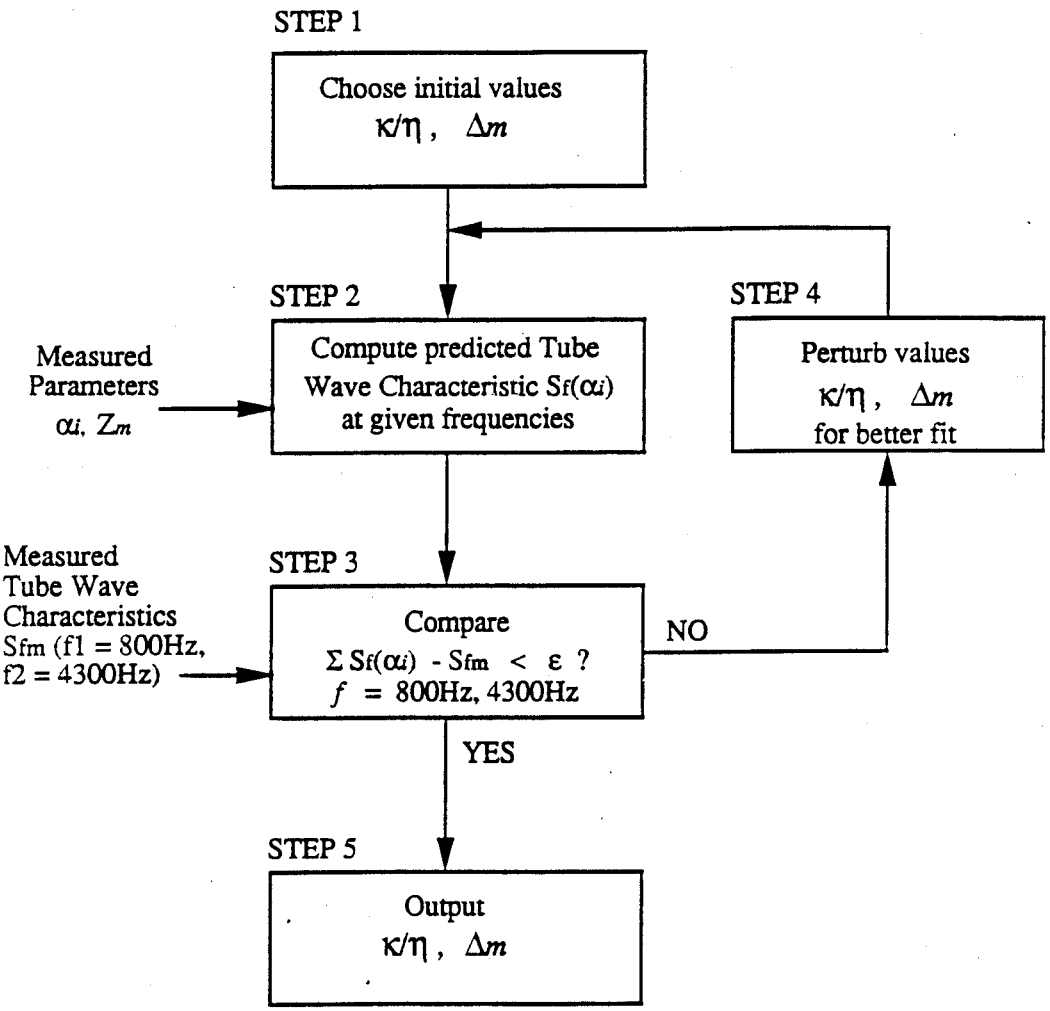
FIG. 1B is a block diagram showing an alternative embodiment of the present invention.

A preferred embodiment of the present invention is shown and described hereinbelow, with reference to the figures. The invention concerns a method which quantitatively links fluid mobility in an earth formation (defined as the formation permeability $\kappa$ divided by the viscosity $\eta$) to the measured characteristics of an acoustic tube wave propagating along the borehole. A mudcake compensated model will be defined which links (1) the measurable parameters $\alpha_i$ of the borehole fluid and rock formation, (2) the parameters of the mudcake covering a borehole wall, and (3) the tube wave characteristics measured by tool. The measurable parameters $\alpha_i$ refer to various properties of the borehole fluid such as its acoustic compressional velocity and density, and various properties of the rock such as porosity, density, compressional and shear velocities, grain and pore properties. Some of these properties are directly measured by known logging services, while others may be inferred from a combination of logged quantities and other known physical data.

Also comprising inputs to the present method are properties of the mudcake. These include the mudcake impedance $Z_m$, and several parameters—the mudcake thickness, density, compressional and shear velocities—which we denote collectively as $\beta_i$, using the indexer i as an indicator of the number of such parameters.

Referring to FIG. 1A, a preferred procedure of the invention is shown as a schematic block diagram. In the first Step 1, certain initial values are chosen for the mobility $\kappa/\eta$ of the formation, the mudcake impedance $Z_m$, and the mudcake parameters $\beta_i$. These initial values plus the measured physical parameters $\alpha_i$ are used at Step 2 to compute theoretic or predicted values of the tube wave characteristic such as slowness $S_f(\alpha_i, \beta_i, Z_m)$ where the subscript f denotes one or more frequencies. These predicted values are compared at Step 3 to the measured values of slowness $S_m$ at the corresponding frequencies. If the difference-squared between the predicted and measured characteristics is smaller than a permissable error value $\epsilon$, then it is presumed that the initially chosen values of $\kappa/\eta$, $Z_m$ and $\beta_i$ are correct, and these are output at Step 5 as the desired answers. However, if the difference or error of fit is greater than $\epsilon$, then an iteration should be performed at Step 4 whereby the values of $\kappa/\eta$, $Z_m$ and $\beta_i$ are perturbed using, for example, the general inverse method to produce better fitting values to be input to Step 2. The Steps 2, 3 and 4 may be repeated until a sufficiently good fit is obtained at Step 3 to obtain the output answers at Step 5. This series of steps comprises an inversion procedure for determining the value of mobility $\kappa/\eta$ (or permeability $\kappa$), and its accuracy depends on the assumptions which are made in calculating the predicted values at Step 2 and the quality of the measured parameters $\alpha_i$. This procedure and its underlying physical assumptions will be described in greater detail, after we review below the borehole measurements which are needed as inputs to the present method.

Although the above procedure has been explained in terms of the tube wave slowness, it is clear that any other tube wave characteristic such as attenuation can also be used in the procedure, and this can be accomplished by performing Step 4 separately for the measured attenuation $A_m$ and the predicted attenuation $A_f(\alpha_i, \beta_i, Z_m)$ at one frequency or at multiple frequencies. It is also desirable to fully utilize all acoustic measurements that a logging tool is capable of taking. If the tool measures both slowness and attenuation, it is desirable to make full use of both types of data to generate a statistically better estimate of formation permeability.

1. Input Parameters

The physical parameters needed as inputs to obtain predicted values of the tube wave characteristics in accordance with the preferred method are summarized in the following Table 1.

TABLE 1: Input Parameters $r_b$: borehole radius
$v_b$: borehole fluid compressional velocity
$\rho_t$: borehole fluid density
$\phi$: rock porosity
$v_p$: saturated rock compressional velocity
$v_s$: saturated rock shear velocity
$\rho$: average rock density
$\rho_s$: rock grain density
$K_s$: rock grain bulk modulus
$K_f$: pore fluid bulk modulus
$\rho_f$: pore fluid density
$\eta$: pore fluid viscosity $Z_m$: mudcake membrane impedance

[Mudcake Parameters $\beta_i$]

$T_m$: mudcake thickness $v_{pm}$: mudcake compressional velocity $v_{sm}$: mudcake shear velocity $\rho_m$: mudcake density $\Delta_m$: net mudcake added slowness (replacing the parameters $T_m$, $v_{pm}$, $v_{sm}$, and $\rho_m$)

The borehole radius $r_b$, formation density $\rho$, porosity $\phi$, the compressional and shear velocities $v_p$, $v_s$ of the formation can all be measured by existing wireline tools which are commercially available in the industry.

The rock grain bulk modulus $K_s$ may be estimated, for example, by reference to the *Handbook of Physical Properties of Rocks*, ed. R. S. Carmichael, CRC Press (1982), for the known rock type. Rock type is determined by known interpretation techniques from the geophysical logs including, for example, the Natural Gamma Ray log, Gamma Ray Spectroscopy and Aluminum-Clay logs, all of which are commercially available services from Schlumberger Well Services (Houston, Texas).

The borehole fluid density $\rho_b$ and borehole fluid velocity $v_b$ can both be measured directly from a mud sample taken at the well site. Alternatively, the borehole fluid slowness may preferably be measured with acoustic transducers built into the logging tool, such as the apparatus and method shown in U.S. Pat. No. 4,633,449.

The pore fluid of the rock formation, having properties of density $\rho_f$, bulk modulus $K_f$, and viscosity $\eta$, can be determined from existing knowledge about the reservoir of interest, or measured from core analysis and/or fluid samples retrieved during well tests. In addition, the pores near the borehole wall are often displaced by the invasion of mud filtrate in which case the pore fluid density, modulus, and viscosity are the same as that of the borehole fluid filtrate, which is readily measured at the well site.

The mudcake thickness $T_m$ may be determined using an ultrasonic measurement in the borehole, for example, using the techniques described in U.S. Pat. No. 4,692,908. Alternatively, an accurate caliper log can provide information of the mudcake thickness when coupled with information about the drill bit size and drilling conditions. The mudcake density $\rho_m$ and compressional velocity $v_{pm}$ can be measured in the laboratory using samples of mudcake. It has been found empirically that the typical range for mudcake density $\rho_m$ is 1.5–2.0 gm/cc and the compressional velocity falls within the range $0.8-1.2 \times v_b$. The shear velocity $v_{sm}$ of the mudcake has been found empirically to be between one-tenth and one-third that of the compressional velocity, and this value may be used absent a direct measurement.

The above parameters can be measured by alternative means, as will be apparent to those skilled in this field. Furthermore, some of the parameters are related to each other and to others not on the above list, so it is clear that different combinations of measurements could achieve essentially the same information content as the above set of parameters, without departing from the spirit and scope of the present method.

The four mudcake parameters of thickness $T_m$, density $\rho_m$, compressional velocity $v_{pm}$, and shear velocity $v_{sm}$ can alternatively be replaced by a single physical parameter, a "mudcake added slowness" parameter which we label as "$\Delta_m$", by making the simplifying approximation $S(\alpha_i, \beta_i, Z_m) = S_O(\alpha_i, Z_m) + \Delta_m$ where $S_O$ is the slowness computed for a mudcake of zero thickness. The parameter $\Delta_m$ can be determined using a best fit of the measured tube wave slowness and attenuation to the mudcake model prediction using data obtained at multiple frequencies, as will be described later in connection with an Example.

Returning to the flow chart of FIG. 1A, illustrating a preferred embodiment of the present method, the measured parameters $\alpha_i$ and some of the parameters $\beta_i$ are input at Step 2, while the other $\beta_i$ parameters are initialized at Step 1 and used as iteration variables. The mudcake membrane impedance $Z_m$ is preferably chosen as an iteration variable, unless its value is already determined for a particular mudcake of a borehole, in which case it may be input as a constant measured parameter. It has been found through laboratory measurements that $Z_m$ falls within the range $(1/\omega)10^{10}-(1/\omega)10^{11}$ dynes-sec/cm$^3$ for materials having the consistency, thickness, and density representative of the range of mudcakes that can exist in boreholes. It has also been found that the present method, when applied to some typical oil wells, yields field results indicting values for $Z_m$ within the narrower range of approximately $2\sim3\times(1/\omega)10^{10}$ dynes-sec/cm$^3$. These values of $Z_m$ are useful for application of the present method to field cases, as will be illustrated below.

2. Predicted Tube Wave Characteristic $S(\alpha_i)$

Figure 2:
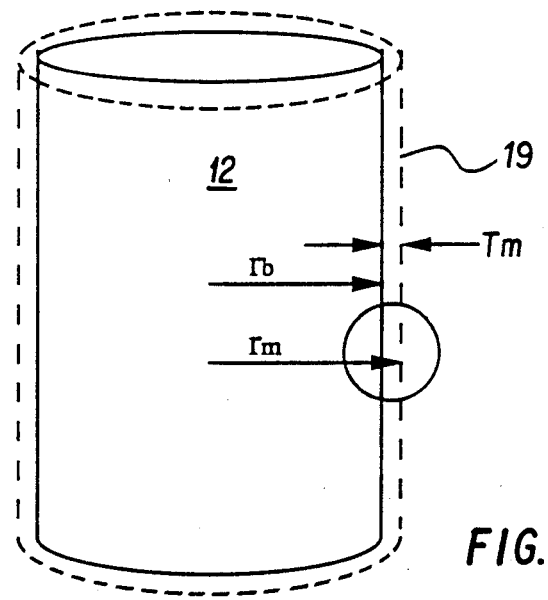
FIG. 2 is an idealized schematic diagram of the borehole showing the finite mudcake layer thereon.

Referring now to FIG. 2, some of the assumptions underlying the present method will be discussed. The borehole 12 is shown schematically as having a layer of mudcake 19 with thickness $T_m$ deposited thereon, where the radius of the borehole including the mudcake layer is $r_b$ and the radius to the formation wall is $r_m$.

Figure 3A:
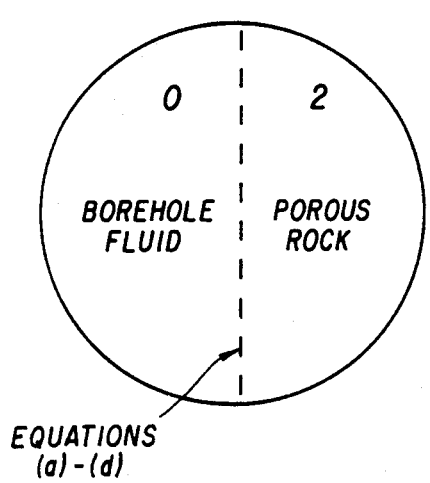
FIG. 3A is a magnified schematic diagram of the circled portion of FIG. 2, showing a representation of the boundary conditions of the borehole in accordance with a method of the prior art.

By the traditional view, referring to FIG. 3A, the mudcake was ignored or presumed to have little acoustic significance. It was assumed in this prior view that the acoustic interaction between the borehole fluid and the porous rock was represented by coupling equations, such as the equations used by J. H. Rosenbaum. These equations (a)–(d) are reproduced herein with slightly altered notation which designate borehole fluid related parameters with the subscript "0", and the rock parameters with the subscript "2". The symbols used in these equations have subscripts which designate the cylindrical coordinates (z=axial direction of the borehole; r=radial direction), and designate whether it represents a parameter in the borehole fluid, in the mudcake, or in the rock domains (0, 1, 2 respectively).

Equation (a) of FIG. 3A represents a continuity of the radial displacement at the borehole fluid to the rock interface, $$U_{r0} = U_{r2}\phi + u_{r2}(1-\phi) \quad \text{(a)}$$

where U is displacement of fluid, u is displacement of rock solid, and $\phi$ is the porosity of the rock. Equation (b) represents the continuity of the normal stress, $$-P_0 = t_{rr2} - \phi P_2 \quad \text{(b)}$$

where P is pressure and $\tau_{ij}$ is a component of the stress tensor with $\tau_{rr2}$ being the normal stress in the solid. Equation (c) represents the vanishing of the solid tangential stress at the interface, since the fluid cannot support such stress.

$$0 = t_{rz2} \tag{c}$$

Equation (d) represents the balance of the borehole pressure to the pore pressure, $$P_0 = P_2 + i\omega Z_m(\omega)\phi(U_{r2} - u_{r2}) \tag{d}$$

where $Z_m(\omega)$ is the mudcake impedance having the units of pressure/velocity of fluid.

The above equations (a)–(d) express the prior art conception that the acoustic tube wave is controlled by direct elastic coupling between the borehole fluid and the rock. However, the mudcake was thought to have the effect of either sealing the borehole wall to produce infinite impedance $Z_m(\omega) = \infty$, in which case it was necessary that $U_{r2} = u_{r2}$; or the mudcake was not sealing, in which case the borehole wall was "open", the mudcake had no acoustic effect, and $Z_m(\omega) = 0$.

In contrast to the above, the preferred method of determining permeability in the present invention modifies the relationship of tube wave to permeability in accordance with the following assumptions. It is assumed that the mudcake 19 having a thickness $T_m$ does acoustically modify the slowness and attenuation of the tube wave in a finite and predictable manner. The exact nature of this modification is best understood by reference to FIG. 3B and the mathematical expressions (1)–(8) below.

Instead of assuming that the mudcake layer "1" has either zero or infinite impedance to acoustic tube wave propagation, as was done in the prior methods (e.g. Rosenbaum, 1974), the present invention requires that the mudcake influence is that of a membrane-like impedance. This type of impedance behavior is used to modify the relationship of the tube wave to the physical parameters of the fluid and the formation, and thus modify the determination of permeability k on the basis of the measured parameters and tube wave characteristics.

Figure 3B:
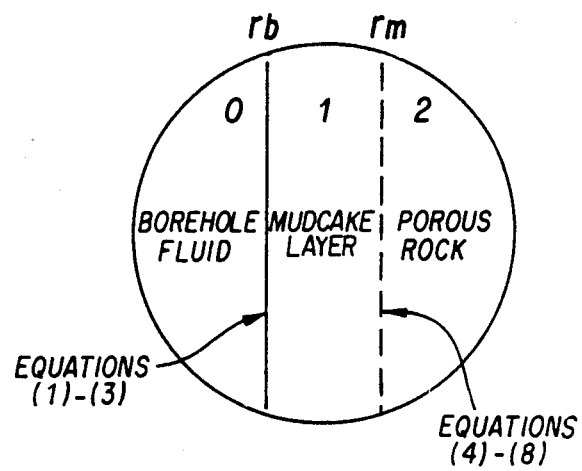
FIG. 3B is a magnified schematic diagram of the circled portion of FIG. 2, showing a representation of the boundary conditions of the borehole consistent with the the present invention.

First, the underlying relationship between the propagating tube wave and the formation's permeability are proposed to be controlled by a different set of boundary conditions dependent on properties of the mudcake layer 19. Referring to FIG. 3B, we define the following three conditions for the acoustic interaction between the borehole fluid domain "0", and the mudcake layer domain "1":

$$U_{r0} = u_{r1} \tag{1}$$

$$-P_0 = \tau_{rr1}, \tag{2}$$

$$0 = \tau_{rz1}, \tag{3}$$

where U denotes the fluid displacement, u is the solid displacement, $P_o$ is the fluid pressure, and $\tau_{ij}$ is the stress component. Equation (1) requires continuity of radial displacement between the borehole fluid domain "0" and the mudcake domain "1". Equation (2) requires continuity in the normal stress, and Equation (3) requires the tangential stress to vanish at that interface. Taken together, these boundary conditions describe the mudcake layer as elastic, and as essentially sealing the borehole wall from any fluid flow between the borehole domain "0" and the rock domain "2" in response to acoustic tube waves generated by the logging tool.

In addition, this model also provides a coupling through the mudcake layer between the borehole fluid and the rock pore fluid, in the nature of a finite "membrane impedance". At the boundary $r_m$ between the elastic mudcake layer and the porous rock, we allow the mudcake layer to vibrate like a membrane across pore openings on the borehole wall surface, as defined by the following boundary conditions:

$$u_{r1} = u_{r2}(1 - \phi) + U_{r2}\phi, \tag{4}$$

$$u_{z1} = u_{z2}, \tag{5}$$

$$\tau_{rr1} = \tau_{rr2} - \phi P_2, \tag{6}$$

$$\tau_{rz1} = \tau_{rz2}, \tag{7}$$

$$-\tau_{rr1} = P_2 + i\omega Z_m(\omega)\phi(U_{r2} - u_{r2}). \tag{8}$$

where $\phi$ is the rock porosity, $\omega$ is the angular frequency and $Z_m(\omega)$ is the mudcake membrane impedance. Equation (4) requires continuity of average radial displacement $U_r$ at the boundary between the mudcake domain "1" and the porous rock domain "2". Equation (5) requires continuity of axial displacement, and Equation (6) requires continuity of average normal stress. Equation (7) requires continuity of tangential stress, which is non-zero, across the same boundary. Equation (8) expresses the requirement of normal stress $\tau_{rr1}$ being balanced by the pore pressure at the pore opening. Unlike the assumptions of the prior art, $Z_m(\omega)$ preferably has the form $Z_m(\omega) = W_m/i\omega$ where $W_m$ is a real number. This impedance function is an appropriate representation for an elastic layer having a membrane-like behavior.

The above eight boundary equations significantly differ from the assumptions of Rosenbaum's four equations in that the present method requires a mudcake layer which modifies the relationship between the tube wave characteristic and the rock permeability, plus a specified membrane impedance which further modifies the relationship between borehole acoustic pressure and the formation pore pressure.

The mudcake compensated model defined by equations (1)–(8) comprise simultaneous equations which can be used to generate a solution linking the acoustic characteristics of the tube wave with the mudcake impedance $Z_m(\omega)$ and the mobility $\kappa/\eta$ in the rock pores. Various ways are known for solving such simultaneous equations using routine skills in the art, and these solutions will not be treated here in detail. For example, the solution may be obtained by constructing an $8 \times 8$ matrix representation of the equations, and solving the following:

$$\det[\text{Matrix}] = 0$$

The determinant of the matrix is preferably computed using commercially available software routines such as the Linpack software routines CGEFA and CGEDI, (1979) available from SIAM, Philadelphia, PA. Also, see J. J. Dongara, et al., *Linpack Users Guide*, (1979). The Matrix is set forth in Appendix 1, which lists all of the elements of the Matrix $d_{ij}$, wherein the subscripts $i = 1, \ldots 8$ and $j = 1, \ldots 8$ refer respectively to row and column elements of the matrix. The elements of the Matrix $d_{ij}$ are defined in terms of the input physical parameters listed in Table 1, and other computational parameters defined in Appendix 1.

Although the matrix representation is used in the presently described preferred embodiment, it is clear that other embodiments exist and can be devised to implement the mudcake compensated model. For example, computational techniques may be used other than matrix computations, and the specific combinations of input parameters may be varied consistently with the gist of the present invention.

Alternative Embodiment Using $\Delta_m$

The mudcake related parameters—$T_m$, $v_{pm}$, $v_{sm}$, and $\rho_m$—may be replaced in an alternative form of the present method by a single net parameter which accounts for the net effect of all the measurable mudcake elastic properties towards the tube wave characteristics. This net mudcake parameter is referred to as the mudcake added slowness $\Delta_m$. At low frequencies it has been found that $S_m$ may be closely approximated by:

$$S(\alpha_i, \beta_i, Z_m) = S_0(\alpha_i, Z_m) + \Delta_m(\beta_i)$$

where $S_0$ is the slowness computed for the case $T_m = 0$ so that $S_0$ does not depend on $T_m$, $v_{pm}$, $v_{sm}$, and $\rho_m$. This alternative is especially useful when one or more of the parameters $T_m$, $v_{pm}$, $v_{sm}$, and $\rho_m$ cannot be easily measured, and cannot be accurately estimated by alternative means. In this case, the same results can be approximated by replacing all four mudcake parameters with the single parameter $\Delta_m$ in the iterative procedure shown in FIG. 1B.

The mudcake compensated model discussed above gives one the ability to determine quantitatively the mobility or permeability of a rock formation of interest, but one must first measure the needed parameters and tube wave characteristics, and perform certain method steps in order to obtain the optimal results.

3. Measured Tube Wave Characteristics

Figure 4:
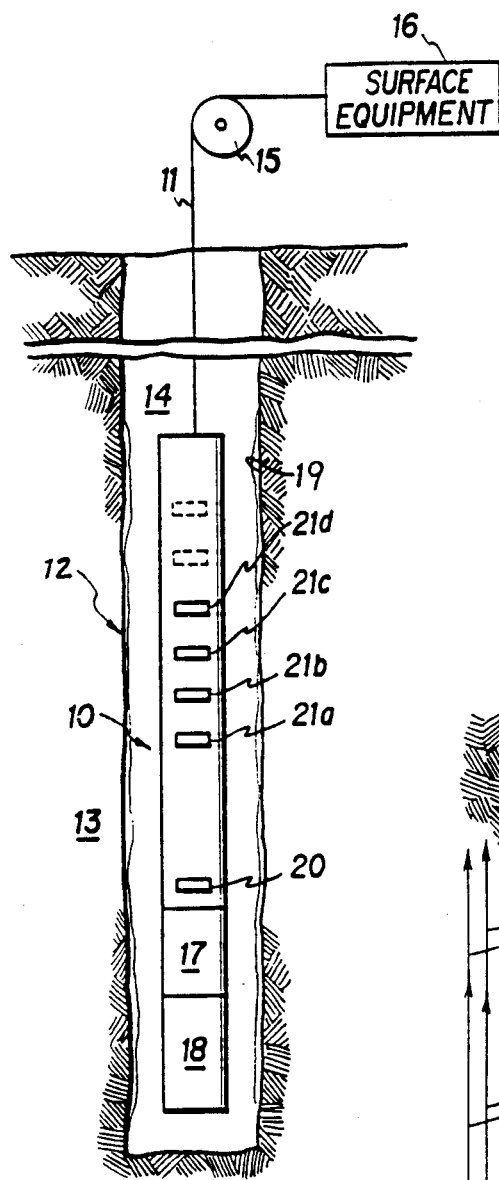
FIG. 4 illustrates a tool positioned in a borehole, in accordance with an exemplary embodiment of the present invention.

Referring to FIG. 4, the acoustic tube wave measurement tool or sonde 10 is preferably connected via an armored communication cable 11 to surface equipment 16. The tool 10 is moveable within a borehole 12 which penetrates earth formations including formation 13. The borehole 12 is filled with a fluid 14 which may be the drilling mud used to stabilize the borehole wall and to prevent uncontrolled escape of formation fluids up the borehole. Because drilling mud tends to infiltrate into a porous, permeable formation such as the formation 13, a layer of mudcake 19 is shown deposited upon the wall of borehole 12.

The tool 10 is moved in the borehole 12 by reeling cable 11 in and out over a sheave wheel 15 by means of a winch forming part of the surface equipment 16. The surface equipment 16 includes a depth gauge and other standard equipment used in the wireline logging or the measurement while drilling ("MWD") industry, and are well known in this field. In the typical borehole logging service, measurements are taken while the tool 10 is being raised upwardly in borehole 12, although in certain circumstances they may also be taken while the tool 10 is stationary, or while it is moving downward, or in some other manner. The measurements are correlated with the measured depth of tool 10, using surface equipment 16 as well as other devices known in the art.

The tool 10 includes at least one acoustic source 20 and an array of acoustic detectors 21 spaced along the tool and separated from the source 20. The number of detectors is typically between 4 and 12, and only 4 detectors or receivers 21a, 21b, 21c, 21d, are explicitly shown in FIG. 4. This type of acoustic array logging tool is commercially available in the logging industry in various forms, and is known as a sonic array or full waveform logging tool. The basic structure and function of this tool is well known in the industry and is described, for example, in U.S. Pat. No. 4,594,691.

The tool 10 may include other component tools, such as an electrical formation resistivity tool 17 and a nuclear tool 18 to obtain various formation measurements as desired. The measurements taken by these and other standard logging tools are also well known in the industry, and therefore will not be described in detail here. It suffices to state that measurements of the formation deep resistivity, shallow resistivity, formation density, porosity, and other parameters can be made by the known techniques, either by combining the various respective tools into one tool string 10, or by making separate logging trips with each tool or appropriate combinations of tools, etc.

During operation of the tool 10, as it is drawn up the borehole 12, the acoustic source 20 is operated repetitively to cause propagation of acoustic energy through the borehole 12 and the surrounding formation 13 to the detectors 21. Electrical waveform signals, generated by the detectors 21 and representative of the respective detected acoustic energies, are sampled and digitized. These digitized signals are suitably conditioned by an interface circuitry in tool 10 and transmitted up the cable 11 to the surface equipment 16. This equipment typically receives, decodes, amplifies and records the signals on optical film and/or magnetic tape recorders as a function of the above mentioned depth signals corresponding to the points of measurement. In addition, the surface equipment 16 may, in accordance with the present invention, analyze the data represented by these signals to yield indications of the fluid flow permeability of the formation 13, and record this additional data.

Figure 5:
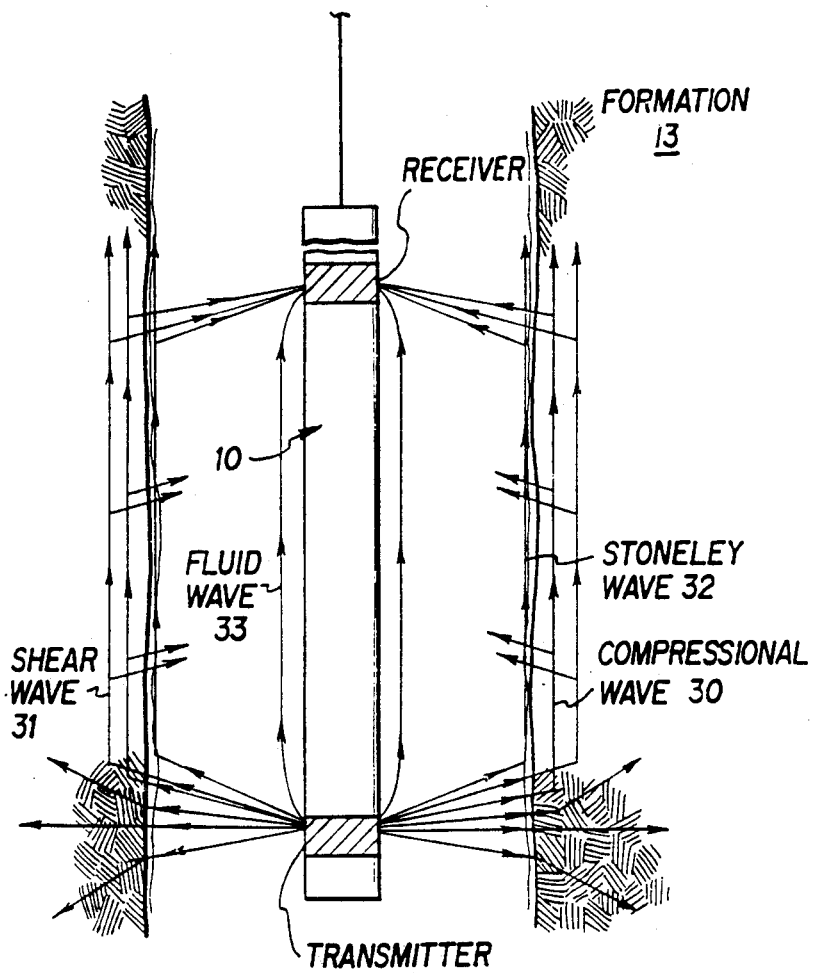
FIG. 5 schematically illustrates the borehole tool of FIG. 4 showing the various types of acoustic waves which travel from a transmitter to a receiver of the tool.

The interval between successive operations of the source 20 is chosen to allow recording of waveforms of sufficient duration to include all components of interest before arrival of energy resulting from the next successive operation of the source 20. As shown schematically in FIG. 5, these acoustic components include the formation compressional wave, also called the P-wave 30, the formation shear wave or S-wave 31, the borehole tube wave or Stoneley wave 32, the borehole fluid wave 33, and various acoustic waves within the body of the tool 10 (not shown). It is the tube wave which is of interest here.

Figure 6:
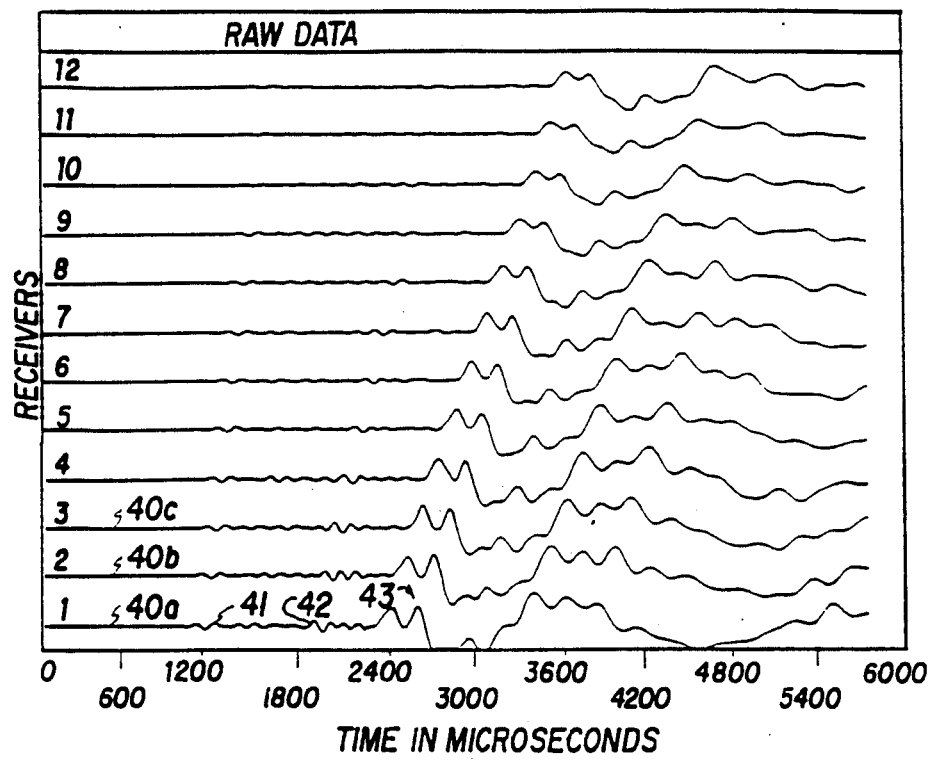
FIG. 6 illustrates the waveforms of acoustic signals received at a set of acoustic receivers spaced from each other along the length of an acoustic tool, as in FIG. 4.

Referring to FIG. 6, an example of the raw data collected by tool 10 is shown, including 12 separate waveforms corresponding to an array of 12 detectors 21a, 21b, ..., 21l. Each waveform 40a, 40b, 40c, ..., is recorded as a signal magnitude as a function of time in microseconds. Each of the waveforms 40 includes a portion wherein the P-wave 41, the S-wave 42, or the tube wave 43 is predominant. It is seen that the tube wave 43 moves out (to the right in FIG. 6) in time from one detector to the next successive detector away from the source 20. Thus we can calculate the tube wave velocity or alternatively the tube wave slowness (in microseconds per foot), these two parameters being the inverse of each other, by simply determining the amount of time it takes for a particular wave front to travel the known distance between the source 20 and the respective detectors 21 of tool 10. It is possible to determine the measured slowness $S_m$ and attenuation $A_m$ more accurately by various other methods known in this field, and those methods may also be used.

The predicted values of slowness S(α) and attenuation A(α) using the above method differ significantly from previous methods which presumed that the mudcake on a borehole wall had no effect on the tube wave, or which presumed that it sealed off the surface pores with a layer of infinite impedance $Z_m = \infty$.

Figure 7:
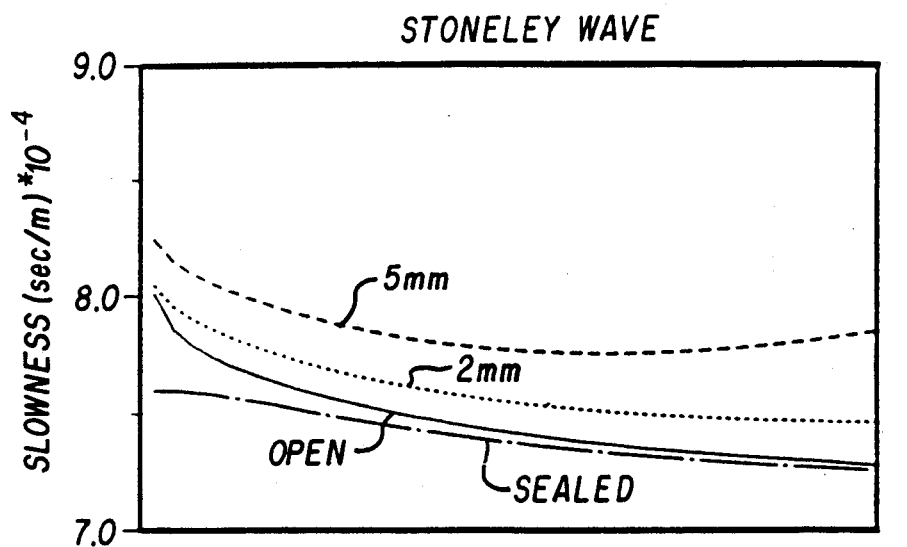
FIG. 7 is a chart showing the frequency dependent response of tube wave slowness predicted for different mudcake conditions.
Figure 8:
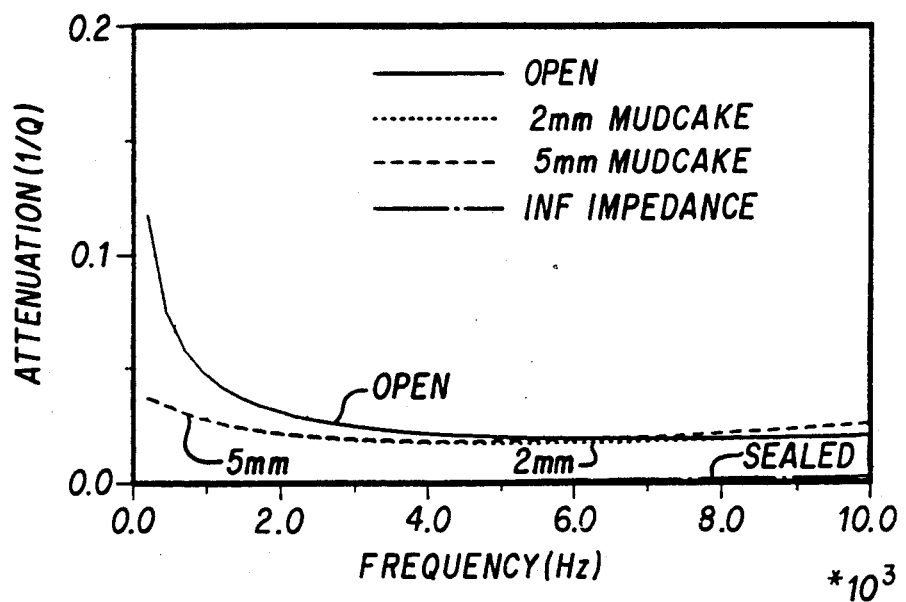
FIG. 8 is a chart showing the frequency dependent response of tube wave attenuation predicted for different mudcake conditions.

Referring to FIG. 7 and FIG. 8, a laboratory comparison of the predicted tube wave slownesses using the present mudcake compensated model is shown in FIGS. 7, 8 as a function of frequency. For purposes of comparison, four curves are shown for the cases of: (1) a mudcake sealed borehole wall with infinite impedance, (2) 2 mm elastic mudcake, (3) 5 mm elastic mudcake, and (4) open borehole with no mudcake layer. The borehole fluid and formation properties are listed in Table 3, infra. The mudcake has the following properties:

TABLE 2

| Mudcake properties | |
|---|---|
| compressional velocity | 4382 ft/sec |
| shear velocity | 1095.6 ft/sec |
| density | 1.8 gm/cc |
| impedance | $2.0 \times 10^{10}$ $(1/\omega)$dynes-sec/cm$^3$ |

It is seen that even a thin layer of mudcake of 2 mm produces a significantly greater tube wave slowness in the present method compared to both the open borehole and the sealed borehole, at all frequencies shown in FIG. 7. The effect of a 5 mm layer of mudcake is seen to be even greater in slowing down the tube wave.

Referring to FIG. 8, the predicted attenuation of the tube wave is seen also to be significantly different in the borehole having mudcake, versus the open hole (zero impedance) and sealed hole (infinite impedance) cases. The laboratory tests illustrated by these figures demonstrate that the effect of a certain thickness of mudcake upon the tube wave characteristics are both substantial and predictable.

EXAMPLE

In this example, referring to FIG. 1B, the mudcake parameters $\beta_i$ are not separately measured, but combined into the single mudcake added slowness $\Delta_m$ which is used as an iteration variable. At Step 1, the values of $\kappa/\eta$ and $\Delta_m$ are initialized at 0 and 0 respectively. The mudcake impedance $Z_m$ is taken to be equal to $(1/\omega)$ $3 \times 10^{10}$ dynes-sec/cm$^3$, based on laboratory measurements which were discussed earlier.

Figure 9:
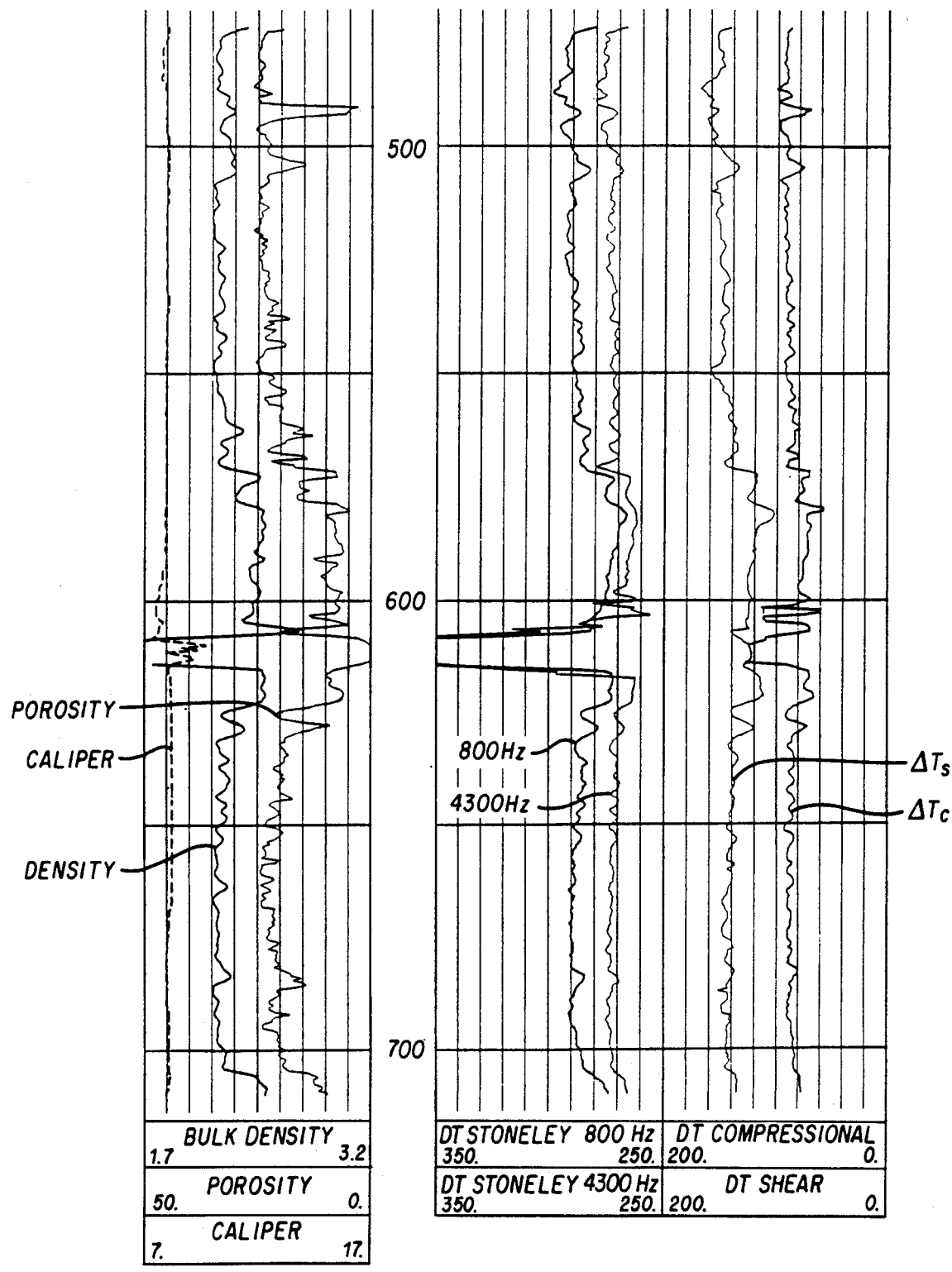
FIG. 9 is a chart showing several measured and derived logs useful to a preferred method of the invention.

The parameters borehole radius $r_b$, porosity $\phi$, $v_p$, $v_s$, $\rho$, and $\rho_s$ are obtained directly or indirectly from wireline logs, as is well known in the industry. As examples, the commercially available services which can provide these measurements are listed in Table 1 above. Referring to FIG. 9, the left side track of the sample log shows a caliper log measuring the borehole diameter ($2 \times r_b$) in a scale of 7–17 inches. It also shows porosity $\phi$ and the average density $\rho$ of the formation in gm/cc. The range of nominal depths covered by this log is shown for convenience as approximately 500 feet to 700 feet. In the middle track are two logs of the tube wave slowness $S_m$ measured in $\mu$sec/ft (inverse of velocity) at the frequencies 800 Hz and 4300 Hz, respectively. In the right hand track are logs of the slowness of the compressional wave ($1/v_p$) and the shear wave ($1/v_s$), respectively.

Figure 10:
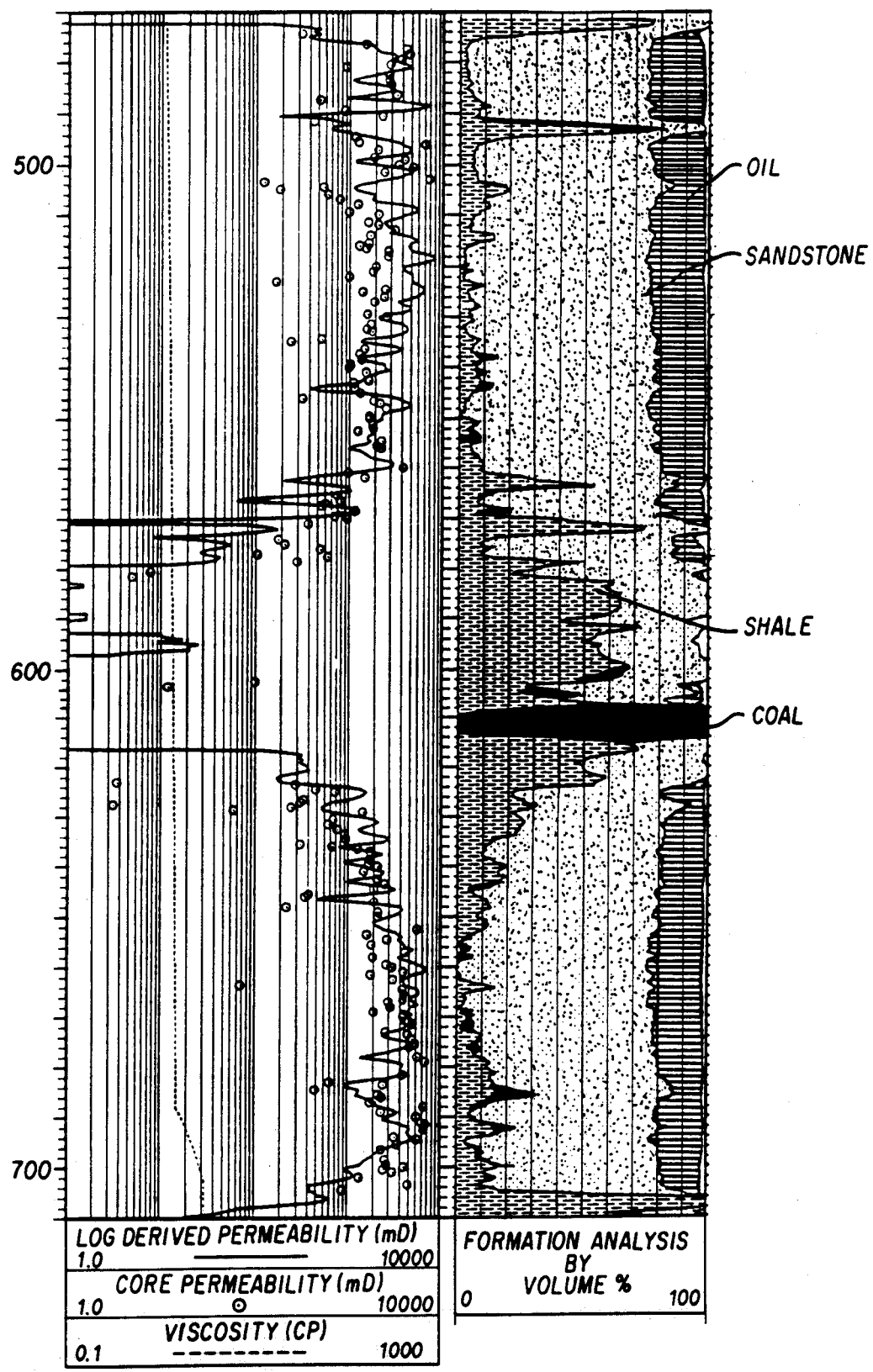
FIG. 10 is a chart showing several measured and derived logs in accordance with a preferred embodiment of the invention.

Referring to FIG. 10, the right hand track shows the processed log known as the ELAN* Analysis By Volume which is available commercially from Schlumberger Well Services, Houston, Texas. This log shows the volumetric composition of the logged formation in terms of oil, sand (quartz), coal (lignite), and shale (clays including illite, kaolinite, and the heavy minerals sidirite and pyrite). It is noted that most of the zones are primarily comprised of sandstone which has a grain bulk modulus $K_s$ of $3.75 \times 10^{11}$ dynes/cm$^2$.

The other parameters $\alpha_2$ are obtained in accordance with Table 1 and the accompanying discussion, and the measured values, used as input parameters, are summarized in Table 3 for nominal depth 650 ft. The iteration variables are also defined below.

TABLE 3: Input Parameters for Example $r_b$: 4.135 in.
$v_b$: 3984 ft/sec
$\rho_b$: 1.222 g/cc
$\phi$: 0.232
$v_p$: 11,110 ft/sec
$v_s$: 7.042 ft/sec
$\rho$: 2.200 g/cc
$\rho_s$: 2.623 g/cc
$K_s$: $3.75 \times 10^{11}$ dynes/cm$^2$
$K_f$: $1.8 \times 10^{10}$ dynes/cm$^2$
$\rho_f$: 0.8 g/cc
$\eta$: 1.43 cp Iteration Variables $\Delta_m$: net mudcake added slowness (replacing the parameters $T_m$, $v_{pm}$, $v_{sm}$, and $\rho_m$) $\kappa/\eta$: mobility Referring again to FIG. 1B, the parameters $\alpha_i$ are input at Step 2 to compute the predicted tube wave slowness at the two frequencies, $S_{(800\ Hz)}$ and $S_{(4300\ Hz)}$, using the matrix determinant program of Appendix I. These values of $S_m$ are test values to be compared at Step 3 to the measured values of $S_{m(800\ Hz)}$ and $S_{m(4300\ Hz)}$ taken from the logs of FIG. 9(center track). At a depth of 650 feet, for example, the measured values for the tube wave are:
at 800 Hz: $S_{m(800\ Hz)} = 280$
at 4300 Hz: $S_{m(4300\ Hz)} = 273$
These values are compared with the simple difference squared:

$$\Sigma(S_f(a) - S_{fm})^2 < \epsilon^2$$

where $\epsilon$ is set at the small value of 0.2 $\mu$sec/ft. Since the initialized values of $\kappa/\eta$ and $\Delta_m$ produced a large error ($>>\epsilon$), the test values of $\kappa/\eta$ and $\Delta_m$ are perturbed at Step 4 to obtain a better fit in the iteration. Steps 2, 3 and 4 are repeated a number of times until the match of the above equation is met, at which time the test values were found to have the following:

$\kappa/\eta = 2294$ mD $\Delta_m = 1.7$ $\mu$sec/ft

Using the simple proportionality, and knowing that viscosity of the fluid is $\eta = 1$ cp, we find that the method predicts a permeability value of approximately 3280 md. This particular example has been confirmed by a laboratory measurement of cores obtained from the borehole. In one of the cores, which was obtained at approximately the nominal depth of 650 ft, the laboratory measured permeability was found to be 2140 md, which is within an error factor of two. Since the range of permeabilities which are considered to be useful in the industry is from about 1 md to 10,000 md, any measurements capable of predicting permeability within a factor of two would be considered fairly good. In addition, it is contemplated that this present approach would yield even more accurate results if more accurate tube wave measurements were made at multiple frequencies including low frequencies.

The above iteration is performed for every zone of interest continuously and produces the log derived permeability curve shown in FIG. 10 (left track). It is seen that the laboratory measured permeability of cores extracted from corresponding zones matches the predicted permeability in these zones. It is also noted that there is some scatter or "error" in the measured core permeability because such measurements may depend on the orientation of the core sample that is used due to anisotropies in the rock. There is, additionally, an intrinsic difference between rock permeability on the small scale of the core sample (typically 2 inches) and on larger scales (several feet) which are measured by the logging tools. Therefore it is to be expected that the log derived permeability may not precisely match the core measurements. It is seen that zone A, being a primarily sandstone formation, has a high permeability in the range of 1000–3000 md. Zone B is seen to have a very large component of shale, which is impermeable, the predicted permeability is in the range under 10 md, as is confirmed by the core measurements.

Although the invention has been described herein with respect to specific embodiments thereof, it will be understood that various modifications and variations may be made thereto without departing from the inventive concepts disclosed. All such modifications and variations, therefore, are intended to be included within the spirit and scope of the appended claims.

APPENDIX I

The elements of $d_{ij}$ are derived from the above eight boundary equations using the elastic theory (ref. Elastic Waves in Layered Media, W. M. Ewing, W. S. Jardetzky and F. Press, International Series in the Earth Science) and Biot's theory (1956 a,b, Theory of propagation of elastic waves in a fluid-saturated porous solid, JASA, 28, 168-191), and are listed below.

$d(1,1) = -\kappa_{rb}J_1(\kappa_{rb}r_b)$
$d(1,2) = \kappa_{rpm}H_1^{(1)}(\kappa_{rpm}r_b)$
$d(1,3) = \kappa_{rpm}J_1(\kappa_{rpm}r_b)$
$d(1,4) = i\kappa_z H_1^{(1)}(\kappa_{rsm}r_b)$
$d(1,5) = i\kappa_z J_1(\kappa_{rsm}r_b)$
$d(1,6) = 0$
$d(1,7) = 0$
$d(1,8) = 0$ $d(2,1) = -\rho_b\omega^2 J_0(\kappa_{rb}r_b)$
$d(2,2) = \rho_m\omega^2 H_0^{(1)}(\kappa_{rpm}r_b) - 2\rho_m v_{sm}^2(\kappa_{rpm}H_1^{(1)}(\kappa_{rpm}r_b)/r_b + \kappa_z^2 H_0^{(1)}(\kappa_{rpm}r_b))$
$d(2,3) = \rho_m\omega^2 J_0^{(1)}(\kappa_{rpm}) - 2\rho_m v_{sm}^2(\kappa_{rpm}J_1(\kappa_{rpm}r_b)/r_b + \kappa_z^2 J_0(\kappa_{rpm}r_b))$
$d(2,4) = i\kappa_z\kappa_{rsm}2\rho_m v_{sm}^2(H_0^{(1)}(\kappa_{rsm}r_b) - H_1^{(1)}(\kappa_{rsm}r_b)/(\kappa_{rsm}r_b))$
$d(2,5) = i\kappa_z\kappa_{rsm}2\rho_m v_{sm}^2(J_0(\kappa_{rsm}r_b) - J_1(\kappa_{rsm}r_b)/(\kappa_{rsm}r_b))$
$d(2,6) = 0$
$d(2,7) = 0$
$d(2,8) = 0$ $d(3,1) = 0$
$d(3,2) = -2i\rho_m v_{sm}^2 \kappa_z \kappa_{rpm} H_1^{(1)}(\kappa_{rpm}r_b)$
$d(3,3) = -2i\rho_m v_{sm}^2 \kappa_z \kappa_{rpm} J_1(\kappa_{rpm}r_b)$
$d(3,4) = (-\rho_m\omega^2 - 2\rho_m v_{sm}^2 \kappa_z^2)H_1^{(1)}(\kappa_{rsm}r_b)$
$d(3,5) = (-\rho_m\omega^2 - 2\rho_1 v_{sm}^2 \kappa_z^2)J_1(\kappa_{rsm}r_b)$
$d(3,6) = 0$
$d(3,7) = 0$
$d(3,8) = 0$ $d(4,1) = 0$
$d(4,2) = -\kappa_{rpm}H_1^{(1)}(\kappa_{rpm}r_m)$
$d(4,3) = -\kappa_{rpm}J_1(\kappa_{rpm}r_m)$
$d(4,4) = -i\kappa_z H_1^{(1)}(\kappa_{rsm}r_m)$
$d(4,5) = -i\kappa_z J_1(\kappa_{rsm}r_m)$
$d(4,6) = \kappa_{rc1}H_1^{(1)}(\kappa_{rc1}r_m)(1-\phi+\xi_1\phi)$
$d(4,7) = \kappa_{rc2}H_1^{(1)}(\kappa_{rc2}r_m)(1-\phi+\xi_2\phi)$
$d(4,8) = i\kappa_z H_1^{(1)}(\kappa_{rsh}r_m)(1-\phi+\xi_3\phi)$ $$\xi_1 = \frac{v_{c1}^2 \overline{\rho_{11}} - P}{v_{c1}^2 \overline{\rho_{12}} - Q}$$

$$\xi_2 = \frac{v_{c2}^2 \overline{\rho_{11}} - P}{v_{c2}^2 \overline{\rho_{12}} - Q}$$

$$\xi_3 = \frac{\alpha - 1}{\alpha}$$

$d(5,1) = 0$
$d(5,2) = i\kappa_z H_0^{(1)}(\kappa_{rpm}r_m)$
$d(5,3) = i\kappa_z J_0(\kappa_{rpm}r_m)$
$d(5,4) = \kappa_{rsm}H_0^{(1)}(\kappa_{rsm}r_m)$
$d(5,5) = \kappa_{rsm}J_0(\kappa_{rsm}r_m)$
$d(5,6) = -i\kappa_z H_0^{(1)}(\kappa_{rc1}r_m)$
$d(5,7) = -i\kappa_z H_0^{(1)}(\kappa_{rc2}r_m)$
$d(5,8) = -\kappa_{rsh}H_0^{(1)}(\kappa_{rsh}r_m)$ $r_m = r_b + T_m$ $d(6,1) = 0$
$d(6,2) = -\rho_m\omega^2 H_0^{(1)}(\kappa_{rpm}r_m) + 2\rho_m v_{sm}^2(\kappa_{rpm}H_1^{(1)}(\kappa_{rpm}r_m)/r_m + \kappa_z^2 H_0^{(1)}(\kappa_{rpm}r_m))$
$d(6,3) = -\rho\omega^2 J_0(\kappa_{rpm}r_m) - 2\rho_m v_{sm}^2(\kappa_{rpm}J_1(\kappa_{rpm}r_m)/r_m + \kappa_z^2 J_0(\kappa_{rpm}r_m))$
$d(6,4) = -2i\kappa_z\kappa_{rsm}\rho_1 v_{sm}^2(H_0^{(1)}(\kappa_{rsm}r_m) - H_1^{(1)}(\kappa_{rsm}r_m)/(\kappa_{rsm}r_m))$
$d(6,5) = -2i\kappa_z\kappa_{rsm}\rho_1 v_{sm}^2(J_0(\kappa_{rsm}r_m) - J_1(\kappa_{rsm}r_m)/(\kappa_{rsm}r_m))$ $$d(6,6) = C_1\kappa_{c1}^2 H_0^{(1)}(\kappa_{rc1}\gamma_m) + 2Nk_{rc1}^2\left(H_0^{(1)}(\kappa_{rc1}\gamma_m) - \frac{H_1^{(1)}(\kappa_{rc1}\gamma_m)}{\kappa_{rc1}\gamma_m}\right)$$

$$d(6,7) = C_2\kappa_{c2}^2 H_0^{(1)}(\kappa_{rc2}\gamma_m) + 2Nk_{rc2}^2\left(H_0^{(1)}(\kappa_{rc2}\gamma_m) - \frac{H_1^{(1)}(\kappa_{rc2}\gamma_m)}{\kappa_{rc2}\gamma_m}\right)$$

$$d(6,8) = 2iNk_z\kappa_{rsh}\left(H_0^{(1)}(\kappa_{rsh}\gamma_m) - \frac{H_1^{(1)}(\kappa_{rsh}\gamma_m)}{\kappa_{rsh}\gamma_m}\right)$$

$C_1 = P - 2N + Q\xi_1 + Q + R\xi_1$ $C_2 = P - 2N + Q\xi_2 + Q + R\xi_2$ $d(7,1) = 0$
$d(7,2) = -2i\rho_m v_{sm}^2 \kappa_z \kappa_{rpm} H_1^{(1)}(\kappa_{rpm}r_m)$ $d(7,3) = -2i\rho_m v_{sm}^2 \kappa_z \kappa_{rpm} J_1(\kappa_{rpm} r_m)$
$d(7,4) = -\rho_m \omega^2 H_1^{(1)}(\kappa_{rsm} r_m) + 2\rho_m v_{sm}^2 \kappa_z^2 H_1^{(1)}(\kappa_{rsm} r_m)$
$d(7,5) = -\rho_m \omega^2 J_1(\kappa_{rsm} r_m) + 2\rho_m v_{sm}^2 \kappa_z^2 J_1(\kappa_{rsm} r_m)$
$d(7,6) = -2iN\kappa_z \kappa_{rc1} H_1^{(1)}(\kappa_{rc1} r_m)$
$d(7,7) = -2iN\kappa_z \kappa_{rc2} H_1^{(1)}(\kappa_{rc2} r_m)$
$d(7,8) = N(-\kappa_{sh}^2 + 2\kappa_z^2) H_1^{(1)}(\kappa_{rsh} r_m)$ $d(8,1) = 0$
$d(8,2) = \phi[-\rho_m \omega^2 H_0^{(1)} (\kappa_{rpm} r_m) + 2\rho_m v_{sm}^2 (\kappa_{rpm} H_1^{(1)} (\kappa_{rpm} r_m)/r_m + \kappa_z^2 H_0^{(1)} (\kappa_{rpm} r_m))]$
$d(8,3) = \phi[-\rho_m \omega^2 J_0(\kappa_{rpm} r_m) + 2\rho_m v_{sm}^2 (\kappa_{rpm} J_1(\kappa_{rpm} r_m)/r_m + \kappa_z^2 J_0 (\kappa_{rpm} r_m))]$ $d(8,4) = \phi \left[ -2i\kappa_z \kappa_{rsm}^2 \rho_m v_{sm}^2 \left( H_0^{(1)}(\kappa_{rsm}\gamma_m) - \frac{H_1^{(1)}(\kappa_{rsm}\gamma_m)}{\kappa_{rsm}\gamma_m} \right) \right]$ $d(8,5) = \phi \left[ -2i\kappa_z \kappa_{rsm}^2 \rho_m v_{sm}^2 \left( J_0(\kappa_{rsm}\gamma_m) - \frac{J_1(\kappa_{rsm}\gamma_m)}{\kappa_{rsm}\gamma_m} \right) \right]$ $d(8,6) = (R\xi_1 + Q)\kappa_{c1}^2 H_0^{(1)} (\kappa_{rc1} r_m) + \kappa_{rc1} H_1^{(1)} (\kappa_{rc1} r_m)(1-\xi_1)(-i\omega X_m)\phi^2$
$d(8,7) = (R\xi_2 + Q)\kappa_{c2}^2 H_1^{(1)} (\kappa_{rc2} r_m) + \kappa_{rc2} H_1^{(1)} (\kappa_{rc2} r_m)(1-\xi_2)(-\omega Z_m)\phi^2$
$d(8,8) = 0$ $H_0^{(1)}$, $H_1^{(1)}$, $J_0$, $J_1$ are Hankel and Bessel functions (Handbook of Mathematical Functions, M. Abramowitz and I. A. Stegun). c1, c2 and sh indicate the fast wave, the slow wave and the shear wave of the permeable medium. $\omega$ is the frequency. $\kappa_z$ is the vertical wavenumber. $\kappa_r$ is the radial wavenumber, and relates to the material property by $\kappa_r^2 = (\omega/v)^2 - \kappa_z^2$, where $v$ is the relevant wave velocity.

$\alpha$ is the complex tortuosity (Johnson, D. L., J. Koplik and R. Dashed, 1987, Theory of dynamic permeability and toruosity in fluid-saturated porous media, J. Fluid Mech., 176, 379-400), and it can be expressed as:

$$\bar{\alpha}(\omega) = \alpha_\infty + \frac{i\eta\phi}{\omega\kappa_0 \rho_f} \left[ 1 - \frac{4i\alpha_\infty^2 \kappa_0^2 \rho_f \omega}{\eta \Lambda^2 \phi^2} \right]^{\frac{1}{2}},$$

wheren $\eta$ is the pore fluid viscosity, $\kappa_0$ is the DC permeability. $\alpha_\infty$ is the tortuosity at infinite frequency, $\Lambda$ is the characteristic length of the pore, and they are related by $$\Lambda^2 = \frac{8\alpha_\infty \kappa_0}{\phi}.$$

The complex permeability can easily be calculated from the complex tortuosity by $$\bar{\kappa}(\omega) = \frac{i\eta\phi}{\bar{\alpha}(\omega)\omega\rho_f}.$$

P, Q, R are the general elastic coefficients. They are related to the material properties as follows:
the shear velocity, $$v_{sh}^2 = \frac{N}{[(1-\phi)\rho_s + (1-\bar{\alpha}^{-1})\phi\rho_f]};$$

the fast wave and slow wave velocities, $$v_{(c1,c2)}^2 = \frac{\Delta \pm [\Delta^2 - 4(\rho_{\overline{11}}\rho_{\overline{22}} - \rho_{\overline{12}}^2)(PR - Q^2)]^{\frac{1}{2}}}{2(\rho_{\overline{11}}\rho_{\overline{22}} - \rho_{\overline{12}}^2)},$$

where
$\Delta = P\rho_{\overline{22}} + R\rho_{\overline{11}} - 2Q\rho_{\overline{12}}$,
$\rho_{\overline{11}} + \rho_{\overline{12}} = (1-\phi)\rho_s$,
$\rho_{\overline{22}} + \rho_{\overline{12}} = \phi\rho$,
$\rho_{\overline{12}} = -(\bar{\alpha}-1)\phi\rho_f$;

$$P = \frac{(1-\phi)(1-\phi-\kappa_b/\kappa_s)\kappa_s + \phi\kappa_s\kappa_b/\kappa_f}{1-\phi-\kappa_b/\kappa_s + \phi\kappa_s/\kappa_f} + 4/3N,$$

$$Q = \frac{(1-\phi-\kappa_b/\kappa_s)\phi\kappa_s}{1-\phi-\kappa_b/\kappa_s + \phi\kappa_s/\kappa_f},$$

$$R = \frac{\phi^2 \kappa}{1-\phi-\kappa_b/\kappa_s + \phi\kappa_s/\kappa_f}.$$

$\rho_s$, $\rho_f$ are the solid and pore fluid densities. $\phi$ is the porosity. $K_s$, $K_f$, $K_b$ and N denote the solid grain modulus, pore fluid bulk modulus, frame bulk modulus and the frame shear modulus. The frame moduli can be derived using Gassmann's low-frequency formula described in the book by J. E. White (Underground Sound, Elsevier, Amsterdam, 1983). The other quantities are measureable for a porous medium and shall be input to the computation.

We claim:

1. A method for determining the mobility of fluid movement in a formation traversed by a borehole, comprising:
    generating an acoustic tube wave in a selected interval of the borehole;
    measuring one or more characteristics of the tube wave in said interval of the borehole;
    generating a test characteristic using a test value for mobility, including contributions from the following:
    (a) a first contribution to said test characteristic derived from a change in the borehole volume due to elastic deformation of the formation surrounding the borehole,
    (b) a second contribution to said characteristic derived from a loss of acoustic energy due to fluid movement relative to the formation matrix,
    (c) a finite mudcake impedance contribution $Z_m$ which modifies the loss of acoustic energy due to fluid movement relative to the formation matrix, wherein $Z_m$ is approximately within the range $(1/\omega)10^{10}$–$10^{11}$ dynes-sec/cm$^3$, where $\omega$ is the angular frequency of the measured tube wave-component, and
    (d) a mudcake layer contribution to said characteristic derived from a volume change in the borehole due to elastic deformation of the mudcake;
    adjusting the test value to minimize any mismatch between the measured characteristic and the generated test characteristic, whereby the test value which gives the best match is determined to be representative of the mobility of said formation.

2. The method of claim 1 wherein measuring the characteristics comprises measuring at least one of the slowness and the attenuation of the tube wave in said interval.

3. The method of claim 1 wherein measuring the characteristics comprises measuring the slowness of the tube wave in said interval at a plurality of frequencies.

4. The method of claim 1 wherein measuring the characteristics comprises measuring the attenuation of the tube wave in said interval at a plurality of frequencies.

5. The method of claim 1 wherein a mudcake impedance value within the range 2-3 $(1/\omega) \times 10^{10}$ dynes-sec/cm$^3$ is used in the generating step.

6. The method of claim 1 wherein said test characteristic is generated subject to boundary conditions at the interface between a mudcake layer and the formation having the following form:

$$u_{r1} = u_{r2}(1-\phi) + U_{r2}\phi,$$

$$u_{z1} = u_{z2},$$

$$\tau_{rr1} = \tau_{rr2} - \phi P_2,$$

$$\tau_{rz1} = \tau_{rz2},$$

and further satisfies a relationship between the stress on the mudcake and the impedance thereof having the following form:

$$-\tau_{rr1} = P_2 + i\omega Z_m(\omega)\phi(U_{r2} - u_{r2})$$

wherein the above symbols are representative of the following physical parameters:
 U fluid displacement
 u solid displacement
 P fluid pressure
 $\tau_{ij}$ stress component
 $\phi$ rock porosity
 $\omega$ angular frequency
 $Z_m(\omega)$ mudcake membrane impedance
and the subscripts designate the following:
 r radial direction of the borehole
 z axial direction of the borehole
 1 mudcake layer region
 2 rock formation region.

7. A method for determining the mobility of fluid movement in a formation traversed by a borehole, including generating an acoustic tube wave within the borehole, detecting at least one characteristic of said tube wave within a selected interval of the borehole, selecting a representation of said characteristic as a function of the borehole fluid parameters and formation parameters, characterized by:

(1) modifying said representation with a finite mudcake impedance contribution $Z_m$ which has a value approximately within the range $(1/\omega) \times 10^{10} - 10^{11}$ dynes-sec/cm$^3$, where $\omega$ is the angular frequency of the measured tube wave component;

(2) generating a value of mobility as a function of the borehole fluid parameters, formation parameters and said finite mudcake impedance contribution.

8. The method of claim 7 characterized by further modifying said representation with a mudcake layer contribution to said characteristic which is dependent on the elastic deformation of the mudcake in response to said tube wave.

* * * * *